United States Patent Office 3,110,547
Patented Nov. 12, 1963

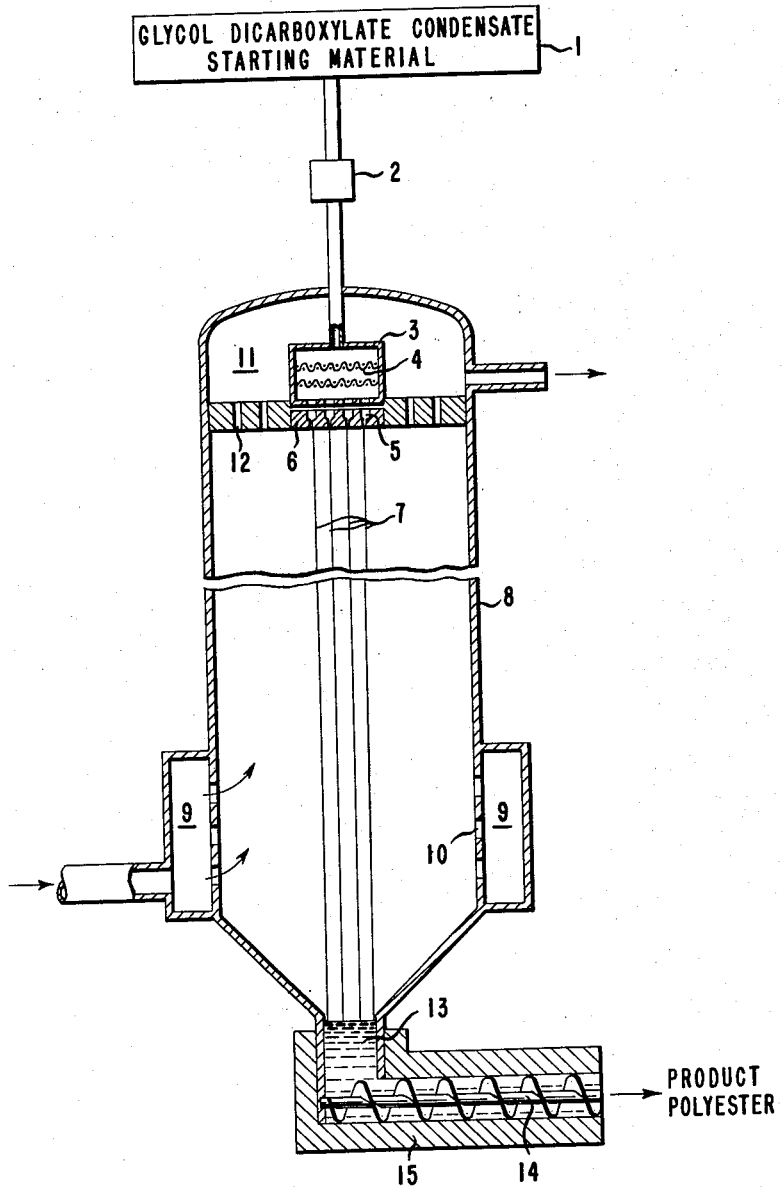

3,110,547
POLYMERIZATION PROCESS
Richard E. Emmert, Wilmington, Del., assignor to E. I. du Pont de Nemours and Company, Wilmington, Del., a corporation of Delaware
Filed July 26, 1961, Ser. No. 127,791
7 Claims. (Cl. 18—54)

This invention relates to a process for preparing linear condensation polyesters, especially the linear terephthalate polyesters. More particularly, it relates to a process for the rapid preparation of linear condensation polyesters of high quality. This application is a continuation-in-part of my copending application Ser. No. 845,170, filed October 8, 1959, now abandoned.

Synthetic linear condensation polyesters, such as polyethylene terephthalate and its copolyesters, have attracted high commercial interest for fibers and many other uses owing to their high tenacity, flexibility, crease resistance, low moisture absorption, and other valuable properties. The conventional method for preparing polyethylene terephthalate involves heating bis-2-hydroxyethyl terephthalate or a polymeric condensate thereof having a low degree of polymerization in the presence of a catalyst under reduced pressure. The reaction is frequently carried out in a tube on the laboratory scale; while on the commercial scale autoclaves have been employed, and the use of a continuous polymerization vessel or series of vessels has also been described. The reaction proceeds by means of polycondensation with evolution of free glycol. Accordingly, in order to decrease the time required for the reaction, means for rapidly regenerating surface area in the reaction mixture are usually employed. For example, the use of a stirrer or agitator equipped with blades, screens, plates, or the like rotating into and out of the surface of the reaction mixture has been described. However, in spite of the use of means for surface regeneration, the reaction generally requires several hours for completion when carried out by prior art methods. Similarly long reaction times have also been considered necessary for the preparation of other linear terephthalate polyesters, such as poly(p-hexahydroxylene terephthalate).

A process for the manufacture of polyethylene terephthalate has been proposed wherein a large amount of surface area is provided by extruding the molten bis-2-hydroxyethyl terephthalate in the form of filaments from a conventional spinneret into a vessel wherein a hot inert gas, such as nitrogen or a hydrocarbon vapor, is caused to flow past the filaments to remove the glycol formed during the reaction. Unfortunately, in previous attempts to carry out such a process, it has been found necessary to use a series of vessels and to recirculate most of the liquid reaction mixture collected at the bottom of each vessel to the top of the same vessel for re-extrusion in order to achieve a product of useful molecular weight. The overall holdup time of the reaction mixture in a polycondensation process of this kind has accordingly been found to be practically the same as the holdup time required in a conventional autoclave run, and the general quality and color of the polymer is also found to be about the same as conventional polymer.

It is therefore an object of the present invention to provide a rapid process for preparing linear condensation polyesters, especially linear terephthalate polyesters such as polyethylene terephthalate and its copolyesters. Another object is to provide a rapid process for producing said polyesters at a high level of quality. A further object is to provide a process adapatable for polymerizing said polyesters to a very high molecular weight. Still another object is to provide a process for rapid production of said polyesters in the form of fibers of high molecular weight and high quality directly from a liquid starting material of relatively low degree of polymerization. Other objects will become apparent as the description of the invention proceeds.

It has now been found that a linear ester condensate, formed by reaction of bifunctional ester-forming reactants with evolution of a volatile byproduct and having a degree of polymerization of at least about 15, can be extruded in the form of filaments having a diameter in the range of 0.5 to 3 mils into an inert atmosphere in which a very low partial pressure of said volatile byproduct is maintained to convert said linear ester condensate to a linear condensation polyester of high molecular weight between the point of extrusion of the filaments and their collection point. The partial pressure of the volatile byproduct is preferably maintained less than 2 mm. of mercury. Recirculation of the product for re-extrusion is not necessary. Surprisingly, although conventional theory would predict that such thin liquid filaments would break up into droplets within a few inches of their point of extrusion, linear ester condensates having a degree of polymerization of about 15 or higher actually form continuous filaments which are readily maintained over vertical distances sufficient to permit attainment of a degree of polymerization of 70 or above. In the case of polyethylene terephthalate, a degree of polymerization of 70 or above corresponds to an intrinsic viscosity of about 0.6, the level generally considered desirable for spinning commercial polyester textile fibers. More surprisingly still, the filaments can be maintained continuous over vertical distances large enough to permit the attainment of a degree of polymerization of 1,000 or more, corresponding in the case of polyethylene terephthalate to intrinsic viscosity levels above 2. Most important of all, degradative reactions are minimized owing to the extremely short reaction time, and the polymers produced are of very high quality and are low in color.

In the preferred embodiment of the process of the invention, the starting material comprises a glycol dicarboxylate condensate, wherein at least about 75% of the dicarboxylate is terephthalate, having a degree of polymerization in the range of 15 to 70 and containing a catalyst for the polymerization thereof. The starting material is heated to a temperature in the range of 300 to 400° C. and extruded in the form of a filament into an inert atmosphere in which the glycol partial pressure is maintained less than 2 mm. of mercury, said filament having a diameter in the range 0.5 to 3 mils as measured 12 inches below the extrusion point. The temperature of the filament is maintained in the range 300 to 400° C. while it falls through a distance of 10 to 80 feet, after which is is collected. The product is a linear terephthalate polyester of a high degree of polymerization. If desired, the polymeric filament may be quenched and wound up, although normally the polymer will be collected in the molten form to be processed further as desired. Of course, the process will normally be carried out by extruding a plurality of filaments simultaneously.

In one embodiment of the invention, the extruded filament is maintained substantially at its extrusion temperature during its fall by passing a current of inert gas maintained substantially at the same temperature through the reaction vessel at a rate sufficient to keep the glycol partial pressure below about 2 mm. of mercury. By "inert gas" is meant a gas free of oxygen and other gases which may react with the polymerizing filament to cause degradation. Suitable inert gases include nitrogen and hydrocarbons such as benzene or toluene which are gaseous at the desired reaction temperature. In another embodiment of the invention, the reaction vessel is evacuated sufficiently to maintain the glycol partial pressure below about 2 mm. of mercury and the filament is maintained substantially at its extrusion temperature during its fall by radiant heating means at the walls of the vessel.

In order to achieve a filament diameter of 0.5 to 3 mils, it has been found that an orifice diameter of 0.5 to 8 mils is required. In general, it is observed that the filament diameter does not exceed the orifice diameter and orifice diameters in excess of about 8 mils are not effective in achieving filament diameters as low as 3 mils. When the rate of extrusion is adjusted to provide a filament diameter of 0.5–3 mils at a distance 12 inches below the orifice and the conditions are otherwise as described, it is observed that the diameter of the filament does not change markedly during the remainder of its fall through the vessel. Although conventional theory would predict that continuity of the filament would be maintained for only a very short distance, continuity of the filament over large vertical distances is actually observed. It is believed that the reason for this is that the viscosity of the surface of the filament increases very rapidly owing to polymerization and promotes filament continuity, although this statement is not intended to be limiting. However, when the degree of polymerization of the starting material is less than about 15, the initial viscosity of the extruded filament and the initial polymerization rate are too low to make possible the maintenance of a continuous filament.

The invention will be more fully understood by reference to the accompanying drawing, which is a partially schematic cross-sectional view of apparatus suitable for carrying out the process of the invention.

Referring now to the drawing, the starting material glycol dicarboxylate or other linear ester condensate is withdrawn from supply vessel 1 at a temperature of 225–250° C. by pump 2 and forced into extrusion head 3, where it is heated to a temperature in the range 300–400° C. by suitable heating means (not shown). Within the extrusion head the condensate passes through suitable filtering means 4, such as a series of screens or foraminous plates, after which it is extruded through orifices 5 in orifice plate 6 to form filaments 7. The filaments fall through reaction vessel 8, within which is maintained an inert atmosphere in which the partial pressure of the volatile by-product is less than 2 mm. of mercury. In the embodiment shown in the figure, inert gas heated to substantially the same temperature as the filament extrusion temperature is caused to flow from annular plenum chamber 9 through apertures 10 upwardly past the falling filaments. The inert gas is removed from the vessel into vapor dome 11 through apertures 12. The linear ester condensate forming the filament undergoes rapid polymerization as it falls through the reaction vessel and is collected as a linear polyester of a high degree of polymerization in melt pool 13. The polymer is then removed from the vessel by means of screw pump 14 surrounded by jacket 15 to maintain the product polyester at the desired temperature. In order to minimize polymer degradation after polymerization, the volume of the melt pool is usually maintained as small as practicable and the jacket surrounding the screw pump is generally employed as a cooling means to lower the temperature of the polymer to a point not far above its melting point.

It will be readily apparent that many modifications may be made in the apparatus. For example, in order to reduce degradation of the starting material ester condensate to a minimum, the heating of the condensate to the required reaction temperature may be postponed until the last possible moment before extrusion by employing an electrically heated orifice plate as the heating means. In place of the plenum chamber for supplying hot inert gas to the reaction vessel, the vessel may be exhausted via the vapor dome and radiant heating means may be employed at the walls of the vessel to maintain the filaments at the desired temperature while they are falling, as indicated above.

In accordance with the invention, the starting material for the reaction is a linear ester condensate, formed by reaction of bifunctional ester-forming reactants with evolution of a volatile byproduct and having a degree of polymerization of at least about 15. By "linear ester condensate" is meant a linear polyester of low molecular weight, containing at least about 15 repeating structural units, and comprising a series of predominantly carbon atom chains joined by recurring divalent ester radicals, each of said ester radicals comprising a carbonyl group attached on at least one side to an oxygen atom. The repeating structural units of the polyester chain are therefore made up of the ester radicals together with the said predominantly carbon atom chains which separate them. As used herein, the term "polyester" is intended to include copolyesters, terpolyesters, and the like; so that the chains which separate the ester radicals may be the same or different. As examples, the chains may be hydrocarbon radicals, halogen-substituted hydrocarbon radicals, and chalkogen-containing hydrocarbon radicals wherein each chalkogen atom is bonded to carbon or a different chalkogen atom, and no carbon is bonded to more than one chalkogen atom. Thus, the repeating units may contain ether, sulfonyl, sulfide, or carbonyl radicals. Various other substituents such as sulfonate salts, sulfonamides, etc., may be present.

The polyesters may be derived from any suitable bifunctional compounds which interact to form esters with evolution of a volatile by-product. In other words, the bifunctional compounds undergo a condensation reaction to form long, linear molecules with periodically spaced ester linking groups in the chain. By "volatile by-product" is meant an organic or inorganic compound, usually of low molecular weight, which is readily distilled out or otherwise removed from the reaction mixture under polycondensation conditions, usually 250–400° C. under vacuum or with a flow or nitrogen gas at about the same temperature as the reaction mixture. Typical examples of volatile by-products are glycol, acetic acid, and phenol.

The bifunctional ester-forming reactant may be an ester of a hydroxy acid with a volatile acid or a volatile glycol or alcohol; for example, the bifunctional ester-forming reactant may be 4-(2-acetoxyethyl)benzoic acid or 2-hydroxyethyl 4-(2-hydroxyethoxy)benzoate. More usually, a suitable dihydroxy compound or derivative thereof is mixed with a suitable dicarboxylic acid or derivative thereof. If either the dihydroxy compound or the dicarboxylic acid is sufficiently volatile, the volatile compound is usually used in excess and during the course of the polycondensation reaction the reaction mixture adjusts itself ever more closely to equimolar quantities of the two reactants. If neither the dihydroxy compound not the dicarboxylic acid is sufficiently volatile, an ester of the dihydroxy compound with a volatile acid is used or, alternately, an ester of the dicarboxylic acid with a volatile hydroxy compound is employed.

Typical dicarboxylic acids which may be employed are terephthalic acid, isophthalic acid, 4,4'-dicarboxydiphenyl ether, 4,4'-diphenic acid, 4,4'-sulfonyldibenzoic acid, 4,4'-benzophenonedicarboxylic acid, 1,2 - bis(4 - carboxyphenoxy)ethane, hexahydroterephthalic acid, bromoterephthalic acid, 5-chloroisophthalic acid, and various of the naphthalenedicarboxylic acids, especially the 1,4-, 1,5-, 2,6-, and 2,7-isomers. Of course, it is frequently desirable to use the dicarboxylic acids in the form of their dimethyl esters or other suitable derivatives.

The dihydroxy compound may be either a bisphenol or a glycol. Typical bisphenols which are suitable (especially in the form of their diacetates or diesters of other volatile acids) include hydroquinone, resorcinol, bis(4-hydroxyphenyl)methane, 1,1-bis-(4 - hydroxyphenyl)ethane, 2,2-bis(4-hydroxyphenyl)propane (more conveniently known as diphenylolpropane), 2,2-bis-(3,5-dichloro-4-hydroxyphenyl)propane, 4,4' - dihydroxybenzophenone, bis-(4-hydroxyphenyl)sulfone, and 1,2-bis-(hydroxyphenyl)ethane. Typical glycols which may be employed as the dihydroxy compound include ethylene glycol, trimethylene glycol, pentamethylene glycol, and cis- or trans-p-hexahydroxylylene glycol, as well as other glycols listed hereinbelow.

In the preferred embodiment of the invention, the starting material for the reaction is a glycol dicarboxylate condensate, wherein at least about 75% of the dicarboxylate is terephthalate, having a degree of polymerization in the range of 15 to 70. The starting material is readily prepared by heating an excess of a glycol or mixture of glycols with terephthalic acid or mixture of dicarboxylic acids containing at least 75% terephthalic acid with removal of the excess glycol until a condensate having a degree of polymerization of at least 15 is achieved. As is well known in the art, ester-forming derivatives of the glycols or acids may be used and the reaction is preferably carried out in the presence of a catalyst and under reduced pressures in the later stages of the reaction. The starting material may be represented in a general way by the formula $$HO-G(OOC-A-COO-G)_x-OH$$

wherein —G— and —A— are divalent organic radicals corresponding, respectively, to the radicals in the initial glycol, $G(OH)_2$, and in the initial dicarboxylic acid, $A(COOH)_2$, and $x$ is a number in the range of 15 to about 70; at least about 75% of the —OOC—A—COO radicals being terephthalate radicals. The terephthalate radical may be the sole dicarboxylate constituent of the recurring structural units, or up to about 25% of the recurring structural units may contain other dicarboxylic radicals, such as the adipate, sebacate, isophthalate, 5-(sodium sulfo)-isophthalate, bibenzoate, 2,6- or 2,7-naphthalenedicarboxylate, hexahydroterephthalate, diphenoxyethane-4,4'-dicarboxylate, or p,p'-sulfonylbibenzoate radicals, derived from the corresponding dicarboxylic acids or ester-forming derivatives thereof.

The glycol, $G(OH)_2$, from which the polyester is prepared may be any suitable dihydroxy compound containing from 2 to 18 carbon atoms, preferably from 2 to 10 carbon atoms, in which the hydroxyl groups are attached to saturated carbon atoms. Preferably, at least about 75% of the glycol is an aliphatic or cycloaliphatic glycol. In the preferred glycols the radical —G— may be represented by the formula $$-(CH_2)_m H_p (CH_2)_n-$$

wherein $m$ and $n$ are integers in the range 1 to 6, H represents a cyclohexane nucleus, and $p$ is 0 or 1. Examples of suitable glycols include ethylene glycol, tetramethylene glycol, hexamethylene glycol, decamethylene glycol, cis- or trans- p-hexahydroxylylene glycol, and cis- or trans- bis-1,4-(hydroxyethyl)cyclohexane. Mixtures of the glycols may be used. The aliphatic or cycloaliphatic glycol may be the sole glycol constituent of the recurring structural units, or up to about 25% of the recurring structural units may contain other glycol radicals, such as bis-p-(2-hydroxyethyl)-benzene or 4,4-bis-(2-hydroxyethyl)biphenyl. Up to about 25 mol percent of diethylene glycol, triethylene glycol, bis-(4-hydroxybutyl) ether, or up to about 15 weight percent of a higher glycol such as a polyethylene glycol of high molecular weight may be added if desired; however, such ether-containing glycols are avoided when it is desired to minimize ether groups in the product. The presence of ether groups in the linear condensation polyester is deleterious to the dye light-fastness of the polymer; however, significant quantities may be desired in the polyester for certain end uses.

Any of the various well-known catalysts for the polymerization of linear ester condensates may be used to promote the rate of reaction. Among such catalysts are glycol-soluble compounds of antimony, especially antimony trioxide; titanate esters, such as tetraisopropyl titanate; litharge (PbO); anhydrous sodium acetate and zinc acetate or other glycol-soluble compounds of zinc. Auxiliary catalyts such as catalysts used in an ester interchange reaction in preparing the linear ester condensate starting material may be present. Such catalysts include glycol-soluble compounds of manganese, lanthanum, and calcium. Color inhibitors, such as phosphoric acid and the phosphate esters, may also be present.

In accordance with the invention, a filament of the starting material having a diameter in the range 0.5–3 mils must be used. When filament diameters greater than 3 mils are used, the height of the vessel becomes very impracticable (in excess of 100 feet) and recycling becomes necessary, greatly increasing the hold-up time of the polymer melt with resultant degradation of the polymer. Below 0.5 mil, filtration of the starting material in the extrusion head becomes very difficult.

A low partial pressure of the volatile by-product in the reaction vessel is required. In accordance with the invention, the partial pressure of the glycol or other volatile by-product should be less than 2 mm. of mercury, and partial pressures less than 0.1 mm. of mercury are preferred, especially in preparing polymers of very high molecular weight.

In practice, the process of the invention may be employed as an extremely rapid finishing step to convert linear ester condensates having a degree of polymerization of from 15 to about 35 to finished polymer having a degree of polymerization of 70 or higher. The resulting polymer is characterized by very high quality; i.e., the polymer has low color and has a low concentration of carboxyl end groups, ether groups, and other degradation products. The process of the invention may also be employed to convert a polymer having a degree of polymerization of up to about 70, i.e., standard commercial polymer, to a very high molecular weight polymer having a degree of polymerization of up to 1000 or more. If desired, polymer of such a high molecular weight can also be prepared directly from a linear ester condensate having a degree of polymerization of at least about 15.

EXAMPLE 1

In a typical run employing the apparatus shown in the figure a condensate of ethylene glycol and terephthalic acid having an intrinsic viscosity of 0.35, corresponding to a degree of polymerization of 28, and containing 0.035 mol percent manganous acetate and 0.031 mol percent antimony trioxide is used as the starting material. The condensate is fed to the extrusion head, where it is heated to 340° C. and extruded through 3-mil orifices into the reaction vessel, which has a height of 20 feet from the orifice plate to the product melt pool. The rate of extrusion is adjusted such that the diameter of the filaments is 1.2 mils, measured 12 inches below the orifice plate. Nitrogen at 340° C. is passed through the vessel and removed through the vapor dome at a rate sufficient to maintain the glycol partial pressure less than 0.1 mm. of mercury in the effluent gas. The product is polyethylene terephthalate having an intrinsic viscosity of 0.6, corresponding to a degree of polymerization of 70, the intrinsic viscosity being measured in solution in Fomal, which comprises 58.8 parts by weight of phenol and 41.2 parts by weight of trichlorophenol. The product has low color and is of exceptionally high quality.

EXAMPLE 2

The procedure of Example 1 is repeated, except that a reaction vessel is employed which has a height of 40 feet from the orifice plate to the product melt pool. The condensate fed to the extrusion head, as well as the nitrogen passed through the vessel, is heated to 346° C. The diameter of the filaments, measured 12 inches below the orifice plate, is 1.2 mils. The product is polyethylene terephthalate having an intrinsic viscosity of 1.2 as measured in Fomal; this corresponds to a degree of polymerization of 230. The product is again of low color and exceptionally high quality.

EXAMPLE 3

In a series of experiments, low molecular weight prepolymers having a degree of polymerization of approximately 15 are prepared by heating various bisphenol diacetates with various dicarboxylic acids in the presence of anhydrous sodium acetate. The polymer abbreviations and starting materials are listed below:

(1) DPP–I: poly(isopropylidene-4,4'-diphenylene isophthalate), prepared from diphenylolpropane diacetate and isophthalic acid.

(2) TeClDPP–I: poly(isopropylidene - 3,3',5,5'-tetrachloro-4,4'-diphenylene 4'',4'''-diphenyletherdicarboxylate), prepared from 2,2-bis(3,5-dichloro-4-hydroxyphenyl)propane diacetate and 4,4'-dicarboxydiphenyl ether.

(3) HQ–HT: poly(1,4 - phenylene hexahydroterephthalate), prepared from hydroquinone diacetate and hexahydroterephthalic acid.

(4) DPP–5ClI: poly(isopropylidene-4,4' - diphenylene 5-chloroisophthalate), prepared from diphenylolpropane diacetate and 5-chloroisophthalic acid.

(5) R–I: poly(1,3-phenylene isophthalate), prepared from resorcinol diacetate and isophthalic acid.

The quantities of starting materials (diacetate, acid and sodium acetate catalyst) are listed in Table I for each of the prepolymers prepared. In each case the reaction is carried out in stages, beginning under atmospheric pressure at about 200° C. and slowly raising the temperature with a stream of nitrogen gas bubbled slowly through the mixture. After distilling out approximately 60% of the theoretical quantity of acetic acid, the pressure is reduced slowly to approximately 1 mm. of mercury and the temperature is then slowly increased again until about 96–97% of the theoretical quantity of acetic acid has been removed. The prepolymer is then cooled and ground up.

Prepolymers prepared as described above are remelted and fed to the extrusion head of the apparatus shown in the figure, where they are heated in each case to the polymerization temperature listed in the table. The hot prepolymer is then extruded through 3-mil orifices into the reaction vessel, which has a height of 40 feet from the orifice plate to the product melt pool. The rate of extrusion is adjusted such that the diameter of the filaments is 1 mil, measured 12 inches below the orifice plate. Nitrogen heated to the same temperature as the extrusion head ("polymerization temperature" in the table) is passed through the vessel and removed through the vapor dome at a rate sufficient to maintain the acetic acid partial pressure less than 0.1 mm. of mercury in the effluent gas. The products are tough filaments of low color and exceptionally high quality. In the case of TeClDPP-I, HQ-HT, and R-I the polyesters are insoluble in Fomal and in trifluoroacetic acid/methylene chloride. The intrinsic viscosities of DPP-I and DPP-5ClI in trifluoroacetic acid/methylene chloride are given in the table.

*Table I*

POLYCONDENSATION IN 40-FOOT VESSEL

| | Polymer Abbreviation | Prepolymer Preparation | | | Polymerization Temperature, °C. | Intrinsic Viscosity |
|---|---|---|---|---|---|---|
| | | Parts Diacetate | Parts Acid | Parts Sodium Acetate | | |
| 1 | DPP–I | 62.47 | 33.23 | 0.164 | 351 | 0.6. |
| 2 | TeClDPP–I | 112.5 | 65.8 | 0.1 | 370 | High ploymer; insoluble. |
| 3 | HQ–HT | 19.4 | 16.6 | 0.05 | 370 | Do. |
| 4 | DPP–5ClI | 22.8 | 20.1 | 0.04 | 380 | 0.6. |
| 5 | R–I | 48.5 | 41.5 | 0.1 | 350 | High polymer; insoluble. |

It will be apparent that many widely different embodiments of this invention may be made without departing from the spirit and scope thereof, and therefore it is not intended to be limited except as indicated in the appended claims.

I claim:

1. The process of preparing a linear condensation polyester which comprises extruding a linear ester condensate, formed by reaction of bifunctional ester-forming reactants with evolution of a volatile by-product including a glycol and having a degree of polymerization of at least about 15, at a temperature between about 300° and 400° C. in the form of filaments having a diameter in the range 0.5 to 3 mils, downwardly through a chamber containing an inert atmosphere in which the partial pressure of said volatile by-product is maintained less than 2 mm. of mercury and maintaining the temperature of the filaments between 300° and 400° C. until a degree of polymerization of at least about 70 is obtained.

2. The process of claim 1 in which the said linear ester condensate is a glycol discarboxylate having the formula HO—G(OOC—A—COO—G)$_x$—OH in which —G— and —A—are divalent organic radicals corresponding, respectively, to the radicals in the initial glycol and dicarboxylic acid and $x$ is an integer in the range of about 15 to 70, at least 75% of the

—OOC—A—COO— radicals being terephthalate radicals.

3. The process of claim 2 in which the degree of polymerization of the incompletely polymerized ester is from about 15 to about 35.

4. The process of claim 1 in which the filaments are approximately one mil in diameter.

5. The process of claim 1 in which the incompletely polymerized ester is extruded at a temperature of about 340° C.

6. The process of claim 1 in which the filaments pass downwardly for a distance of from about 10 feet to 80 feet.

7. The process of claim 1 in which the filaments are collected at the base of the said chamber as a melt.

References Cited in the file of this patent

UNITED STATES PATENTS 2,719,776   Kummel 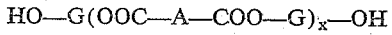 Oct. 4, 1955